United States Patent
Chen et al.

(10) Patent No.: US 9,374,771 B2
(45) Date of Patent: Jun. 21, 2016

(54) MESSAGE ACKNOWLEDGEMENT METHOD, APPARATUS, AND SYSTEM

(71) Applicant: Huawei Device Co., Ltd., Shenzhen, Guangdong (CN)

(72) Inventors: Ji Chen, Shenzhen (CN); Zhiming Ding, Shenzhen (CN); Young Hoon Kwon, San Diego, CA (US)

(73) Assignee: Huawei Device Co., Ltd., Shenzhen (CN)

( * ) Notice: Subject to any disclaimer, the term of this patent is extended or adjusted under 35 U.S.C. 154(b) by 184 days.

(21) Appl. No.: 14/064,768

(22) Filed: Oct. 28, 2013

(65) Prior Publication Data

US 2014/0119282 A1    May 1, 2014

(30) Foreign Application Priority Data

Oct. 29, 2012    (CN) .......................... 2012 1 0420869

(51) Int. Cl.
*H04L 12/28*    (2006.01)
*H04W 48/16*    (2009.01)

(52) U.S. Cl.
CPC ..................................... *H04W 48/16* (2013.01)

(58) Field of Classification Search
USPC .......................... 370/241, 248, 328, 338, 389
See application file for complete search history.

(56) References Cited

U.S. PATENT DOCUMENTS

| | | |
|---|---|---|
| 2005/0177639 A1 | 8/2005 | Reunamaki et al. |
| 2006/0251021 A1 | 11/2006 | Nakano et al. |
| 2011/0142019 A1 | 6/2011 | Bharghavan et al. |
| 2011/0317569 A1 | 12/2011 | Kneckt et al. |
| 2012/0087358 A1* | 4/2012 | Zhu ...................... H04W 72/042 370/338 |
| 2013/0304938 A1* | 11/2013 | Hayes ..................... H04L 45/22 709/239 |

FOREIGN PATENT DOCUMENTS

| | | |
|---|---|---|
| CN | 1838623 A | 9/2006 |
| WO | WO 0149004 A1 | 7/2011 |
| WO | WO 2012077908 A1 | 6/2012 |
| WO | WO 2012096549 A2 | 7/2012 |

\* cited by examiner

*Primary Examiner* — Yemane Mesfin
*Assistant Examiner* — Mon Cheri Davenport
(74) *Attorney, Agent, or Firm* — Leydig, Voit & Mayer, Ltd.

(57) ABSTRACT

A message acknowledgement method includes: An access point sends a beacon frame, receives an uplink frame sent by a terminal, and sends an acknowledgement frame for the uplink frame, where the acknowledgement frame includes offset time, and the offset time is a difference between a time point when the access point sends the acknowledgement frame and a time point when the access point sends the beacon frame; compares the difference that is obtained through calculation by the terminal and is between the time point when the terminal receives the acknowledgement frame and the time point when the terminal lately receives a beacon frame with the offset time carried in the acknowledgement frame, and if a difference between the two is within a preset error range, determines that the acknowledgement frame received by the terminal is sent by the access point associated with the terminal.

18 Claims, 4 Drawing Sheets

MESSAGE ACKNOWLEDGEMENT METHOD, APPARATUS, AND SYSTEM

CROSS-REFERENCE TO RELATED APPLICATION

This application claims priority to Chinese Patent Application No. 201210420869.2, filed on Oct. 29, 2012, which is hereby incorporated by reference in its entirety.

TECHNICAL FIELD

The present invention relates to the field of communications technologies, and in particular, to a message acknowledgement method, apparatus, and system.

BACKGROUND

In a communications network, request frames, such as a PS-Poll (Power Save Poll, which is a power saving mode frame), all have a defined frame structure, including a physical header part and a media access control layer (Media Access Control, MAC for short) part. Later, in further development, a new PS-Poll structure is proposed. This type of the new structure also performs a function of the PS-Poll, but is relatively simplified, reducing a load of network transmission. This type of the new structure only has a physical header part, and therefore, is called an NDP PS-Poll. NDP is the abbreviation of No Data Packet, that is to say, there is no data part, which means that there is no MAC layer part, and there is only a physical header.

After an NDP PS-Poll is used, because the NDP PS-Poll is relatively short, so that it is incapable of holding a 48-bit basic service set identifier (basic service set identifier, BSSID for short), namely a destination address, and may only use a short destination address, for example, 9-bit. The 9-bit address is calculated by using the original 48-bit long destination address, or obtained by using another method. We call the short destination address as PBSSID (Partial BSSID), that is, a part of BSSID. However, no matter how, because the address is too short, an address conflict, that is, a PBSSID conflict, occurs easily. The situation when the conflict occurs is that, after a station (Station, STA for short) sends an NDP PS-Poll, two or more than two access points (Access Point, AP for short) receive the NDP PS-Poll at the same time, and those APs all consider, through determining, that the NDP PS-Poll is sent to themselves, because their PBSSIDs are the same. Because a downlink data frame is generally longer than an acknowledgement frame (Acknowledgement, ACK for short), in order to prevent that, in a case of a PBSSID conflict, interference occurs between a downlink data frame directly sent by an AP and a downlink data frame or an ACK acknowledgement frame sent by another AP at the same time, causing a waste of a relatively long time, one skilled in the art once proposed to a limitation that after receiving an NDP PS-Poll, an AP must send an ACK acknowledgement frame first, and then send downlink data, instead of sending the downlink data directly. However, in this case, the STA receives ACKs returned by a plurality of APs at the same time, and at this time, the ACKs have interference between each other, but the STA is incapable of distinguishing, and may only receive an ACK sent by an AP associated with the STA itself, and may also only receive an ACK sent by another certain AP. Similar to the PS-Poll, a new ACK structure is also proposed, and also has only a physical header. This type of new ACK frame structure is called short ACK. A short ACK carries an ACK_ID, where the ACK_ID carries some information. An STA that receives a short ACK identifies, by using the ACK_ID information, whether the short ACK is sent to the STA itself. An ACK_ID in the prior art is calculated by using some information in that frame acknowledged by the ACK_ID. For example, an STA sends a frame, e.g., frame1, to an AP, the AP obtains an ACK_ID through calculation by using some information of the frame1, and includes the ACK_ID in a short ACK, and sends the short ACK to the STA; after receiving the short ACK, the STA knows that the short ACK is sent to the STA itself, and is an acknowledgement reply to the frame1 sent by the STA itself.

However, during a research and practice procedure of this method, the inventor of the present invention finds that: When the frame1 is an NDP PS-Poll, if a PBSSID conflict occurs, a plurality of APs return short ACKs. However, ACK_IDs in the short ACKs are all calculated by referring to the same NDP PS-Poll. Therefore, the ACK_IDs are all the same. Then, after receiving the short ACKs, an STA is incapable of determining whether a short ACK is sent to the STA itself by an AP associated with the STA itself.

SUMMARY

Embodiments of the present invention provide a message acknowledgement method, apparatus, and system, so that in a case that an access point address conflict occurs, a terminal is also capable of distinguishing an access point from which a received acknowledgement message comes, that is, the terminal is capable of determining whether the received acknowledgement message is sent by an access point associated with the terminal.

In a first aspect, an embodiment of the present invention provides a message acknowledgement method, including:

sending a beacon frame;

receiving an uplink frame sent by a terminal; and sending an acknowledgement frame for the uplink frame, where the acknowledgement frame includes offset time, and the offset time is a difference between a time point when the acknowledgement frame is sent and a time point when the beacon frame is sent, so that a terminal that receives the acknowledgement frame determines, according to the offset time, a time point when the acknowledgement frame is received, and a time point when the terminal lately receives a beacon frame, whether the acknowledgement frame is an acknowledgement frame that the terminal expects.

In a first possible implementation manner, the message acknowledgement method is applied to wireless fidelity communications.

In a second possible implementation manner, with reference to the first aspect, or with reference to the first possible implementation manner of the first aspect, the uplink frame is a downlink data request frame, where a sending address in the downlink data request frame is a compressed terminal address of the terminal, and/or, a receiving address in the downlink data request frame is a compressed access point address of an access point.

In a third possible implementation manner, with reference to the first aspect, or with reference to the first possible implementation manner of the first aspect, or with reference to the second possible implementation manner of the first aspect, a unit of the offset time is larger than a unit of timing time for controlling sending of the beacon frame and the acknowledgement frame.

In a second aspect, an embodiment of the present invention also provides another message acknowledgement method, including:

receiving a beacon frame sent by a first access point;

sending an uplink frame to the first access point;

receiving an acknowledgement frame, where the acknowledgement frame includes first offset time, and the first offset time is a difference between a time point when an access point that sends the acknowledgement frame sends the acknowledgement frame and a time point when the access point lately sends a beacon frame;

calculating second offset time, where the second offset time is a difference between a time point when the acknowledgement frame is received and a time point when the beacon frame is received; and comparing the first offset time with the second offset time, and if a difference between the two is within a preset error range, determining that the acknowledgement frame is an acknowledgement frame for the uplink frame by the first access point.

In a first possible implementation manner of the second aspect, the message acknowledgement method may be applied to wireless fidelity communications.

In a second possible implementation manner, with reference to the second aspect, or the first possible implementation manner of the second aspect, the uplink frame is a downlink data request frame, where a sending address in the downlink data request frame is a compressed terminal address of a terminal, and/or, a receiving address in the downlink data request frame is a compressed access point address of the first access point.

In a third possible implementation manner, with reference to the first possible implementation manner of the second aspect, or the second possible implementation manner of the second aspect, a unit of the first offset time is larger than a unit of timing time for controlling sending of the beacon frame and the acknowledgement frame.

In a third aspect, an embodiment of the present invention also provides a message acknowledgement access point, including a first sending unit, a receiving unit, a second sending unit, and a first timing unit, where the first sending unit is configured to send a beacon frame;

the receiving unit is configured to receive an uplink frame sent by a terminal;

the second sending unit is configured to send an acknowledgement frame according to the uplink frame received by the receiving unit, where the acknowledgement frame includes offset time obtained through calculation by the first timing unit, so that a terminal that receives the acknowledgement frame determines, according to the offset time, a time point when the acknowledgement frame is received, and a time point when the terminal lately receives a beacon frame, whether the acknowledgement frame is an acknowledgement frame that the terminal expects; and the first timing unit is configured to record a time point when the acknowledgement frame is sent and a time point when the beacon frame is sent, and determine a difference between the two as the offset time.

In a fourth aspect, an embodiment of the present invention also provides a message acknowledgement terminal, including a first receiving unit, a sending unit, a second receiving unit, a second timing unit, and a determining unit, where the first receiving unit is configured to receive a beacon frame sent by a first access point;

the sending unit is configured to send an uplink frame to the first access point;

the second receiving unit is configured to receive an acknowledgement frame, where the acknowledgement frame includes first offset time, and the first offset time is a difference between a time point when an access point that sends the acknowledgement frame sends the acknowledgement frame and a time point when the access point lately sends a beacon frame;

the second timing unit is configured to record a time point when the acknowledgement frame is received and a time point when the beacon frame is received, and determine a difference between the two as second offset time; and the determining unit is configured to compare the first offset time with the second offset time, and if a difference between the two is within a preset error range, determine that the acknowledgement frame is an acknowledgement frame for the uplink frame by the first access point.

In a fifth aspect, an embodiment of the present invention also provides a message acknowledgement system, including a first access point and a terminal, where the first access point is configured to send a beacon frame and receive an uplink frame sent by the terminal, and send an acknowledgement frame for the uplink frame, where the acknowledgement frame includes first offset time, and the first offset time is a difference between a time point when the acknowledgement frame is sent and a time point when the beacon frame is sent; and the terminal is configured to receive the beacon frame sent by the first access point and send the uplink frame to the first access point, and receive the acknowledgement frame and calculate second offset time, where the second offset time is a difference between a time point when the acknowledgement frame is received and a time point when the beacon frame is received, and compare the first offset time with the second offset time, and if a difference between the two is within a preset error range, determine that the acknowledgement frame is an acknowledgement frame for the uplink frame by the first access point.

It can be seen from the foregoing that, in the embodiments of the present invention, an access point sends a beacon frame first, and after receiving the beacon frame, a terminal sends an uplink frame to the access point; the access point that receives the uplink frame sends an acknowledgement frame for the uplink frame, where the acknowledgement frame includes first offset time, that is, a difference between a time point when the access point sends the acknowledgement frame and a time point when the access point sends the beacon frame; and the terminal calculates second offset time, that is, a difference between a time point when the terminal receives the acknowledgement frame and a time point when the terminal receives the beacon frame, compares the first offset time with the second offset time, and if a difference between the two is within a preset error range, determines that the acknowledgement frame is an acknowledgement frame for the uplink frame by the access point. Therefore, when an access point address conflict occurs, although a plurality of access points all receive an uplink frame, and at the same time, all send an acknowledgement frame to a terminal, first offset time included in an acknowledgement frame sent by each access point is not the same, and the terminal obtains second offset time by starting timing at a time point when the terminal receives a beacon frame sent by an access point associated with the terminal. Therefore, the second offset time obtained through calculation by the terminal is consistent with the first offset time of the access point associated with the terminal. As a result, the terminal may compare the second offset time obtained through calculation by the terminal itself with the first offset time in the received acknowledgement frame, and if a difference between the two is within a preset error range, determine that the acknowledgement frame is an acknowledgement frame for an uplink frame by the access point associated with the terminal, thereby determining whether the received acknowledgement frame is an acknowledgement frame that the terminal expects.

DESCRIPTION OF EMBODIMENTS

Figure 1:
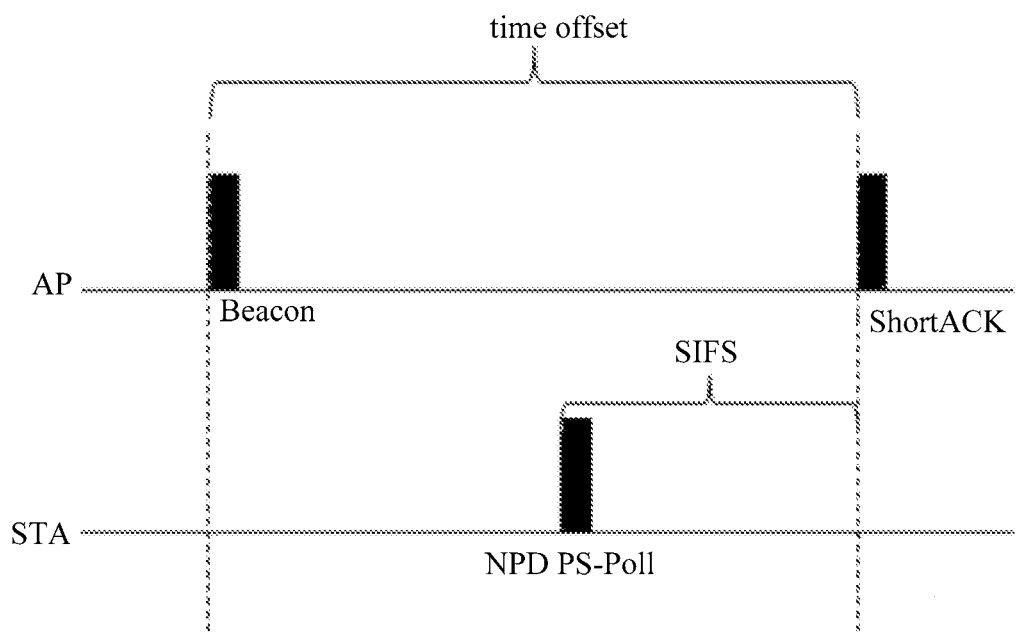
FIG. 1 is a schematic scenario diagram of a message acknowledgement method according to an embodiment of the present invention.

Embodiments of the present invention provide a message acknowledgement method, apparatus, and system, so that in a case that an access point address conflict occurs, a terminal is also capable of distinguishing an access point from which a received acknowledgement message comes, that is, determining whether the acknowledgement message received by the terminal is sent by an access point associated with the terminal. The following gives detailed description separately.

Before the embodiments of the present invention are described in detail, the following briefly describes message transfer in a wireless communications network.

In a communications network, in order to let a sending party of a message know that the message sent by the sending party has been correctly received by a receiving party, there is an acknowledgement reply mechanism, that is, the receiving party of the message sends an acknowledgement frame (Acknowledgement, ACK for short) to the sending party of the message. This mechanism means that after receiving data sent by a sending party, a receiving party sends an ACK to the sending party, so that the sending party knows that the data has been received by the receiving party. Message transmission manners may be divided into broadcast, multicast, and unicast, where the broadcast and the multicast are one-to-multiple transmission, and the unicast is one-to-one transmission. Generally, only in a case of unicast, an ACK needs to be sent.

This mechanism is also used in WiFi (Wireless Fidelity, that is, wireless fidelity). Composition of a WiFi network is that an access point (Access Point, AP for short) provides access services for a plurality of stations (Station, STA for short), and the AP and an STA exchange information by using a wireless signal. An AP and an STA are two typical nodes in a WiFi network. When any two nodes in WiFi perform data transmission, if it is in a unicast transmission manner, a receiving party always replies with an ACK to a sending party, so that the sending party knows that the transmission is successful.

In the WiFi network, the AP, as a network central node, periodically broadcasts a beacon frame, which is called Beacon in English, where the Beacon carries network information, including information such as a name, a frequency, and a Beacon period. An STA finds, by listening to the Beacon, existence of the AP, and according to a demand, associates with the AP and performs subsequent communication with the AP, and so on. The STA may enter a sleeping state according to a situation, to facilitate power saving. When being in a sleeping process, the STA needs to wake up periodically to listen to a Beacon, in order to know a network condition. This period may be a Beacon period, and may also be a certain multiple of a Beacon period, and certainly, the STA may not sleep.

When an STA is in a sleeping state, if an AP associated with the STA has downlink data to be transmitted to the STA, the AP first caches the data on the AP, and then, informs the STA by using a TIM (traffic indication map) carried in a Beacon. A TIM (traffic indication map) is an indication that is carried in a Beacon and indicates that there is cached data, and a function of the TIM is to indicate which STAs among those STAs associated with the AP have downlink data cached on the AP. Therefore, after a sleeping STA wakes up, the STA may know, by receiving a Beacon, whether the STA itself has data cached on the AP.

If the STA knows that the STA itself has data cached on the AP, the STA sends a request frame to the AP, which is called a PS-Poll, to tell the AP that the STA has woken up and the AP may send downlink data of the STA to the STA. After receiving the PS-Poll, the AP may directly return the downlink data of the STA to the STA, and may also first send an acknowledgement frame (Acknowledgement, ACK for short) to the STA, and then, the STA keeps awake all along to wait for the AP to send the downlink data.

To make a person skilled in the art better understand the solutions of the present invention, the following clearly describes the technical solutions in the embodiments of the present invention with reference to accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

An embodiment of the present invention discloses a message acknowledgement method, including:

sending a beacon frame;

receiving an uplink frame sent by a terminal; and sending an acknowledgement frame for the uplink frame, where the acknowledgement frame includes offset time, where the offset time is a difference between a time point when the acknowledgement frame is sent and a time point when the beacon frame is sent, so that a terminal that receives the acknowledgement frame determines, according to the offset time, a time point when the acknowledgement frame is received, and a time point when the terminal lately receives a beacon frame, whether the acknowledgement frame is an acknowledgement frame that the terminal expects.

The message acknowledgement method provided by the embodiment of the present invention may be applied to wireless fidelity communications.

It should be noted that, in the embodiment of the present invention, after sending the beacon frame and before sending the acknowledgement frame, an access point receives the uplink frame sent by the terminal; otherwise, the access point does not send the acknowledgement frame. The access point herein may be a base station in a wireless communications network.

Furthermore, the uplink frame may be a downlink data request frame, and a sending address in the downlink data request frame may be a compressed terminal address of the terminal, and/or, a receiving address in the downlink data request frame may be a compressed access point address of the access point. For example, a 48-bit terminal address or access point address may be compressed into a 9-bit terminal address or access point address. After the sending address and/or the receiving address adopts a compressed address, the number of bits occupied by the uplink frame is reduced, thereby reducing a load of network transmission.

Furthermore, the acknowledgement frame may not include access point address information and terminal address information. Because an acknowledgement frame sent by each access point in the embodiment of the present invention includes offset time, and the offset time in the acknowledgement frame sent by each access point is not the same, the offset time may be used as a distinction of an access point. Therefore, the access point address information in the acknowledgement frame may be removed, thereby reducing the number of bits occupied by the acknowledgement frame, and reducing a load of network transmission. Moreover, the acknowledgement frame is returned by the access point to the terminal for the uplink frame sent by the terminal. Therefore, the terminal address information in the acknowledgement frame may be further removed, thereby reducing a load of network transmission.

In addition, in the embodiment of the present invention, a unit of the offset time may be larger than a unit of timing time for sending the beacon frame and the acknowledgement frame, so that a relatively small number of bits are occupied to transmit the offset time. Because the offset time is a difference value between the time point when the beacon frame is sent and the time point when the acknowledgement frame is sent, assume that a timing unit for recording time from sending the beacon frame to sending the acknowledgement frame is usually 1 microsecond, and convert the unit of interval time from sending the beacon frame to sending the acknowledgement frame to a larger unit; for example, convert a time unit of 1 microsecond to a time unit of 256 microseconds; in this way, a time value of the interval time is decreased, and therefore, the number of bits occupied by the time value may be reduced, thereby reducing a network load.

In the embodiment of the present invention, a new method for calculating an ACK_ID of an acknowledgement frame is adopted, where the ACK_ID carries some information. The terminal that receives the acknowledgement frame identifies, by using the ACK_ID information, whether the acknowledgement frame is sent to the terminal itself, and even if an access point address conflict occurs, that is, in a case that access point addresses included in uplink frames conflict (for example, PBSSIDs conflict), the terminal that receives the acknowledgement frame can also determine whether the acknowledgement frame is sent to the terminal itself.

Specifically speaking, in the embodiment of the present invention, a new method for calculating an ACK_ID of an acknowledgement frame includes: An access point sends a beacon frame, and records a time point when the beacon frame is sent; and after receiving an uplink frame sent by a terminal, the access point sends an acknowledgement frame for the uplink frame, and records a time point when the acknowledgement frame is sent, to obtain interval time between sending the beacon frame and sending the acknowledgement frame, which is marked as offset time, and places the offset time in an ACK_ID, so that an acknowledgement frame carrying the ACK_ID is sent to the terminal, and the acknowledgement frame may not include access point and/or terminal address information.

Specifically speaking, first, an access point sends a beacon frame to a terminal, and records a sending time point t1;

the terminal receives a beacon frame sent by an access point associated with the terminal itself, and records a time point t1' when the beacon frame is received, and the terminal determines, according to a TIM carried in the beacon frame, whether the terminal itself has data cached on the access point, and if yes, the terminal sends a downlink data request frame to the access point, where a receiving address of the downlink data request frame may adopt a compressed access point address, and/or, a sending address of the downlink data request frame may adopt a compressed terminal address;

after the access point receives the downlink data request frame, and after short inter frame interval time (Short Inter Frame Space, SIFS for short) passes, that is, at a time point t2, the access point returns an acknowledgement frame to the terminal, where the acknowledgement frame includes an ACK_ID, where the ACK_ID carries t2−t1, and the SIFS herein is a limitation of a WiFi network; and after receiving the acknowledgement frame, the terminal records a time point t2' when the acknowledgement frame is received, and reads out t2−t1 carried in the ACK_ID in the acknowledgement frame, and then calculates t2'−t1', and compares t2'−t1' with t2−t1, where if a difference between them is within a preset error range, it indicates that the acknowledgement frame received by the terminal is sent by the access point of the terminal itself to the terminal itself.

Considering wireless signal transmission time, actually, a time point when a terminal receives a beacon frame is a little bit larger than a time point when an access point associated with the terminal sends the beacon frame. However, considering that a wireless signal transmission speed is 300,000 kilometers per second, that is, 300 meters per microsecond, while in a WiFi network, a distance between an access point and a terminal is generally several ten meters to several hundred meters, and transmission time is generally smaller than 1 microsecond, in the embodiment of the present invention, it may be regarded that a sending time point of the access point associated with the terminal is equal to a receiving time point of the terminal. In the foregoing embodiment, if the acknowledgement frame received by the terminal is sent by the access point associated with the terminal to the terminal itself, it may be regarded that t1 is equal to t1', and t2 is equal to t2'.

Furthermore, a unit of the foregoing offset time is larger than a unit of timing time for controlling sending of the beacon frame and the acknowledgement frame, so that the offset time occupies a relatively small number of bits. It can be seen from the foregoing that, in the embodiment of the present invention, an acknowledgement frame carrying offset time is sent to a terminal, where the offset time corresponds to each access point, and at the same time, the terminal records offset time of an access point associated with the terminal. Therefore, after receiving the acknowledgement frame, the terminal compares the offset time carried in the acknowledgement frame with the offset time recorded by the terminal, so that the terminal may determine whether the acknowledgement frame is sent by the access point associated with the terminal itself to the terminal itself.

An embodiment of the present invention also provides a message acknowledgement method, including:

receiving a beacon frame sent by an access point;

sending an uplink frame to the access point;

receiving an acknowledgement frame, where the acknowledgement frame includes first offset time, and the first offset time is a difference between a time point when an access point that sends the acknowledgement frame sends the acknowledgement frame and a time point when the access point lately sends a beacon frame;

calculating second offset time, where the second offset time is a difference between a time point when the acknowledgement frame is received and a time point when the beacon frame is received; and comparing the first offset time with the second offset time, and if a difference between the two is within a preset error range, determining that the acknowledgement frame is an acknowledgement frame for the uplink frame by the access point.

The access point herein may be a base station in a wireless communications network.

The message acknowledgement method provided by the embodiment of the present invention may be applied to wireless fidelity communications.

Furthermore, the uplink frame may be a downlink data request frame, and a sending address in the downlink data request frame is a compressed terminal address of a terminal, and/or, a receiving address in the downlink data request frame is a compressed access point address of the access point.

Furthermore, the acknowledgement frame may not include access point address information and terminal address information.

A unit of the foregoing first offset time is larger than a unit of timing time for controlling sending of the beacon frame and the acknowledgement frame, so that the first offset time occupies a relatively small number of bits.

It can be seen from the foregoing that, an acknowledgement frame received by a terminal includes first offset time, and the first offset time corresponds to a sending party of the acknowledgement frame, that is, an access point, and the terminal records a time difference between a time point when the terminal receives a beacon frame and a time point when the terminal receives the acknowledgement frame, that is, second offset time, and moreover, the second offset time is consistent with first offset time of an access point associated with the terminal. Therefore, after receiving the acknowledgement frame, the terminal may compare the first offset time carried in the acknowledgement frame with the second offset time recorded by the terminal itself, thereby determining whether the acknowledgement frame is sent by the access point associated with the terminal to the terminal itself.

Figure 2:
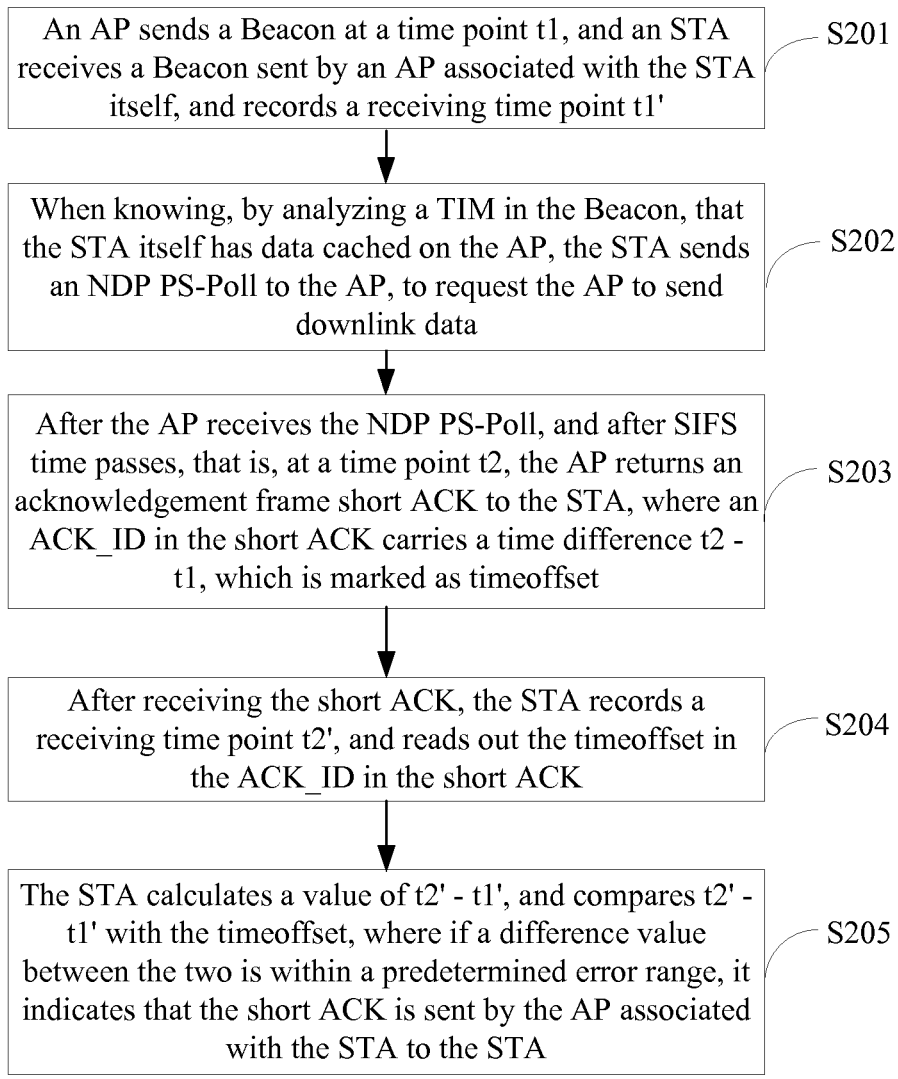
FIG. 2 is a schematic flowchart of a message acknowledgement method according to an embodiment of the present invention.

An embodiment of the present invention also provides a message acknowledgement method, and with reference to what is shown in FIG. 1 and FIG. 2, the method includes the following steps:

S201: An access point AP sends a beacon frame Beacon at a time point t1, and a station STA receives a Beacon sent by an AP associated with the STA itself, and records a receiving time point t1'.

According to the foregoing description, it may be regarded that t1' is equal to t1.

S202: The station STA knows, by analyzing a TIM in the Beacon, that the station STA itself has data cached on the AP, and consequently, sends an uplink frame, for example, sends an NDP PS-Poll frame to the AP, to request the AP to send downlink data.

S203: After the access point AP receives the NDP PS-Poll, and after SIFS time passes, that is, at a t2 time, the access point AP returns an acknowledgement frame, for example, a short ACK, to the STA, where an ACK_ID in the short ACK carries a time difference between the time point t1 when the AP sends the Beacon and the time point t2 when the AP sends the short ACK, that is, t2−t1, and t2−t1 is marked as a time offset herein. The SIFS herein is an existing limitation in a WiFi network, which limits that a time point when a short ACK is sent must be after SIFS time passes after data of the other party is received.

S204: After receiving the short ACK, the STA records time t2' when the short ACK is received, and reads out the time offset carried in the ACK_ID in the short ACK.

S205: The STA calculates a value of t2'−t1', and compares t2'−t1' with the time offset, where if a difference value between them is within a predetermined error range, it indicates that the short ACK is sent by the AP associated with the STA to the STA.

Actually, if the ACK received by the STA comes from is sent by the AP associated with the STA, it may be regarded that t1' is equal to t1, and t2' is equal to t2.

In an embodiment, for determining, by an AP/STA, a time point when a Beacon and a short ACK is sent/received, it may be accurate to 1 microsecond. The AP and the STA each has a timer inside, where a unit of the timer is 1 microsecond.

A time unit of the time offset carried in the short ACK may be preset, and for example, may be 1 millisecond, 500 microseconds, or 250 microseconds.

In actual usage, due to a length limitation of an ACK_ID, which may be a length of more than ten and less than twenty or twenty binary bits, it is more preferable that, 256 microseconds are taken as a time unit. 256 microseconds are used as a time unit because it is only required to remove last 8 bits of a timer.

For example, a time point 1: xxxxxxxx xxxxxxx xxxxxxxx xxxxxxxx microseconds a time point 2: yyyyyyyy yyyyyyyy yyyyyyyy yyyyyyyy microseconds In the foregoing, x and y both indicate a binary bit, and a unit of the timer is microsecond. The time point 1 is xx . . . xx microseconds, and the time point 2 is yy . . . yy microseconds, and after last 8 bits are removed, it is equivalent to taking 256 microseconds as a unit.

Units of t1' and t2' and the unit of the time offset may be coordinated by using the following manner. For example, an AP sends a Beacon at a time point t1, and sends a short ACK at a time point t2, and assume that a predetermined unit of the time offset is 256 microseconds, a value of the time offset is (t2−t1)/256, where only a value of an integer part is taken, and the value of the integer part is placed in an ACK_ID of the short ACK; and then, after recording a time point t1' when the Beacon is received and a time point t2' when the short ACK is received, an STA also takes a value of an integer part according to this calculation manner. In this way, a unit of the value calculated by the STA is consistent with the unit of the value carried by the short ACK. Certainly, another value taking method, for example, rounding off, may also be stipulated, as long as the AP and the STA adopt a same calculation method.

Figure 3:
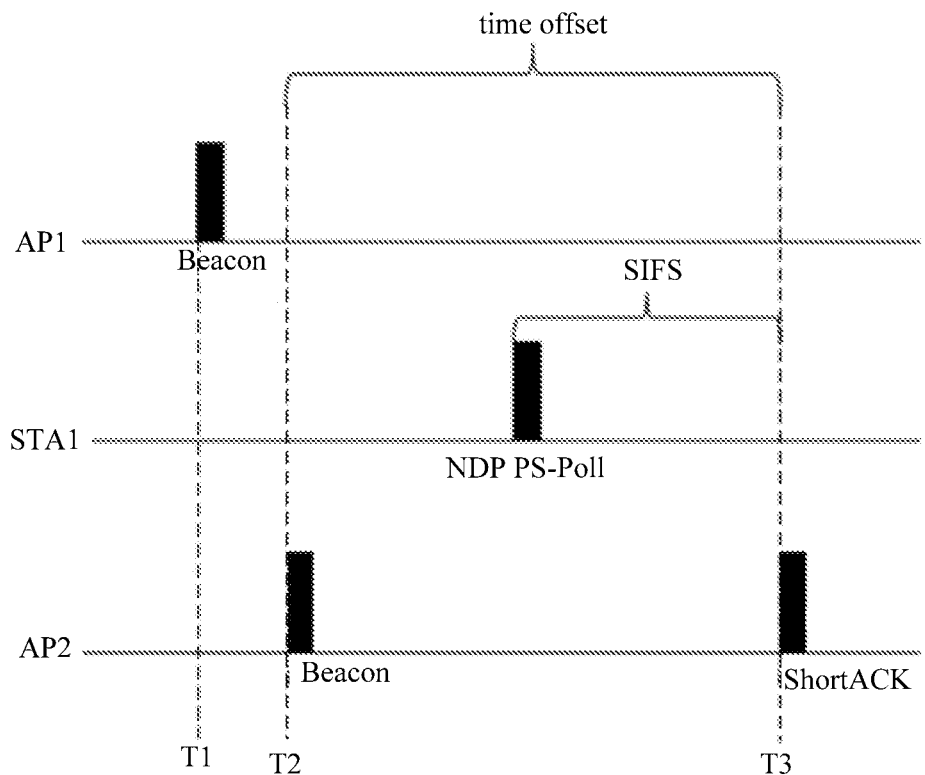
FIG. 3 is a schematic scenario diagram of another message acknowledgement method according to an embodiment of the present invention.

It can be seen from the foregoing that, a short ACK received by an STA includes a time offset, and the time offset corresponds to a sending party of the short ACK, that is, an AP, and the STA records a time difference between a time point when the STA receives a Beacon and a time point when the STA receives the short ACK, and values of the two, the time difference and a time offset of an AP associated with the STA, are basically consistent (for example, a difference value of the two is within a predetermined error range). Therefore, after receiving the short ACK, the STA may compare the time offset carried in the short ACK and the time difference recorded by the STA itself, thereby determining whether the short ACK is sent by the AP associated with the STA to the STA itself An embodiment of the present invention provides another message acknowledgement method, and with reference to FIG. 3, in a case that it may be regarded that a sending time point of an access point associated with a terminal is equal to a receiving time point of the terminal, the method includes:

At a time point T1, an access point AP1 sends a beacon frame Beacon; and because a station STA1 belongs to a network of the AP1, the STA1 receives the Beacon and records the time T1.

Then, at a time point T2, an access point AP2 also sends a Beacon; because the STA1 does not belong to a network of the AP2, the STA1 does not care about the Beacon, and does not record T2.

The STA1 knows that the STA1 itself has data cached on the AP1, and therefore, sends an NDP PS-Poll, where the NDP PS-Poll carries a 9-bit short destination address. Because PBSSIDs of the AP1 and the AP2 are the same, that is, a PBSSID conflict just happens, the AP1 and the AP2 both receive the NDP PS-Poll, and both consider that the NDP PS-Poll is given to themselves. Consequently, after an SIFS passes, that is, at a time point T3, the AP1 and the AP2 sends a short ACK at the same time.

Assume that, due to some reasons, the STA1 does not receive the short ACK of the AP1, but receives the short ACK of the AP2, in this case, the STA1 calculates a time difference between a time point when the STA1 itself receives the Beacon and a time point when the STA1 itself receives the short ACK, that is, T3−T1. However, a time offset carried in the short ACK is a difference between the time point T3 when the AP2 sends the short ACK and the time point T2 when the AP2 sends the Beacon, that is, T3−T2. In this way, the STA1 finds, by comparison, that the time difference calculated by the STA1 itself is not consistent with the time difference time offset carried in the short ACK, and therefore, determines that the short ACK is not sent by the AP of the STA1 itself to the STA1 itself When knowing that after the STA1 itself sends the ND PS-Poll and the SIFS passes, the received short ACK is not returned by the AP1 of the STA1 itself, the STA1 may know that the PBSSID conflict occurs, and consequently, the STA1 may take some measures to solve the PBSSID conflict problem. These measures may have a plurality of types, for example, the STA1 may not wait for downlink data any longer, and the STA1 may report to the AP1 of the STA1 itself that a short destination address conflict is found.

One more point should be noted that, assuming that the time unit carried in the short ACK is 256 microseconds, that is, the unit time of the time carried in the short ACK is set to 256 microseconds, if a difference (T2−T1) between time when the AP1 sends the Beacon and time when the AP2 sends the Beacon is smaller than 256 microseconds, an STA cannot determine, by using this method, whether a received short ACK is sent by an AP associated with the STA itself. Therefore, during a specific implementation process of this method, unit time carried in a short ACK is smaller than or equal to a possible minimum time interval between two Beacons. The unit time herein is preset according to a demand, and may be 100 microseconds, or 256 microseconds, or the like. In the embodiment of the present invention, because a Beacon length may be larger than 500 microseconds, that is, a time interval between two Beacons may be larger than 500 microseconds, by using time accuracy of 256 microseconds, the STA may determine whether the received short ACK is sent by the AP associated with the STA itself.

It can be seen from the foregoing that, a short ACK received by an STA includes a time offset, and the time offset corresponds to a sending party of the short ACK, that is, an AP, and the STA records a time difference between a time point when the STA receives a Beacon and a time point when the STA receives the short ACK, and the difference is consistent with a time offset of an AP associated with the STA. Therefore, after receiving the short ACK, the STA may compare the time offset carried in the short ACK and the time difference recorded by the STA itself, thereby determining whether the short ACK is sent by the AP associated with the STA to the STA itself.

Figure 4:
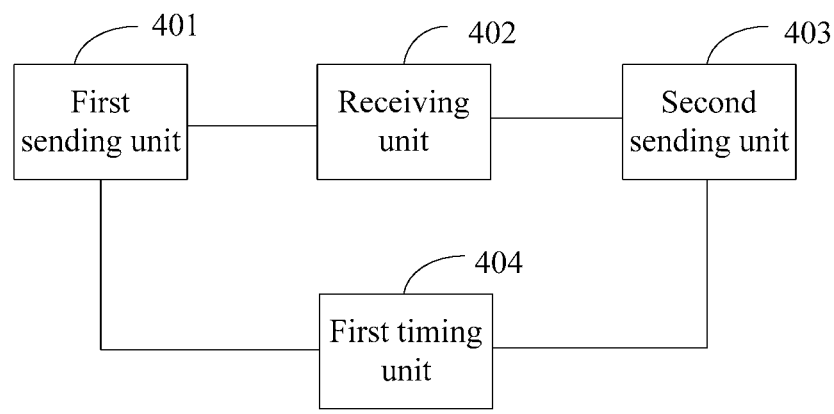
FIG. 4 is a schematic structural diagram of a message acknowledgement access point according to an embodiment of the present invention.

An embodiment of the present invention also provides a message acknowledgement access point, with reference to FIG. 4, including: a first sending unit 401, a receiving unit 402, a second sending unit 403, and a first timing unit 404, where the first sending unit 401 is configured to send a beacon frame;

the receiving unit 402 is configured to receive an uplink frame sent by a terminal;

the second sending unit 403 is configured to send an acknowledgement frame according to the uplink frame received by the receiving unit 403, where the acknowledgement frame includes offset time obtained through calculation by the first timing unit 404, so that after receiving the acknowledgement frame, a terminal that receives the acknowledgement frame determines, according to the offset time, a time point when the acknowledgement frame is received, and a time point when the terminal lately receives a beacon frame, whether the acknowledgement frame is an acknowledgement frame that the terminal expects; and the first timing unit 404 is configured to record a time point when the second sending unit 403 sends the acknowledgement frame and a time point when the first sending unit 401 sends the beacon frame, and determine a difference between the two as the offset time.

It can be seen from the foregoing that, in the message acknowledgement access point provided by the embodiment of the present invention, the first timing unit 404 records the offset time, that is, a time difference between sending the acknowledgement frame and sending the beacon frame, and the second sending unit 403 places the offset time in the acknowledgement frame and sends the acknowledgement frame to the terminal, so that the terminal may determine, according to a difference between time when the terminal receives the beacon frame and time when the terminal receives the acknowledgement frame, and the offset time, whether the acknowledgement frame is sent by an access point associated with the terminal to the terminal itself.

Figure 5:
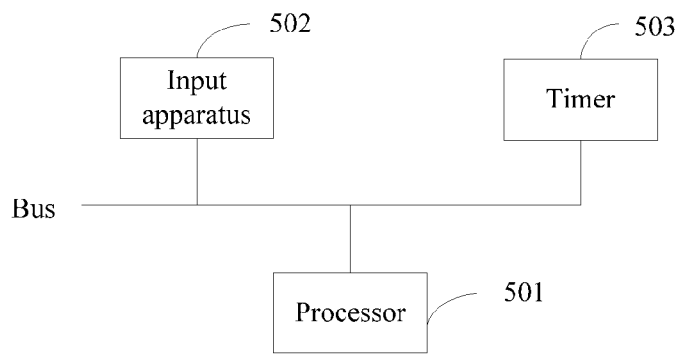
FIG. 5 is a schematic structural diagram of another message acknowledgement access point according to an embodiment of the present invention.

With reference to FIG. 5, an embodiment of the present invention also provides a message acknowledgement access point, including: a processor 501, an input apparatus 502, and a timer 503. In some embodiments of the present invention, the processor 501, the input apparatus 502, and the timer 503 may be connected by using a bus or another manner, where in FIG. 5, a connection by using a bus is taken as an example.

The processor 501 performs the following steps: sending a beacon frame; if receiving an uplink frame request signal from the input apparatus 502, sending an acknowledgement frame according to the uplink frame request signal, where the acknowledgement frame includes offset time obtained through calculation by the timer 503, so that after receiving the acknowledgement frame, a terminal that receives the acknowledgement frame may determine, according to the offset time, a time point when the acknowledgement frame is received, and a time point when the terminal lately receives a beacon frame, whether the acknowledgement frame is an acknowledgement frame that the terminal expects.

In the embodiment of the present invention, the input apparatus 502 may receive an uplink frame sent by a terminal, and send the uplink frame request signal to the processor 501.

The timer 503 may record a time point when the processor 501 sends the beacon frame and a time point when the processor 501 sends the acknowledgement frame, and determine a difference between the two as the offset time, and send the offset time to the processor 501.

It can be seen from the foregoing that, in the embodiment of the present invention, the processor 501 sends the acknowledgement frame according to the uplink frame sent by the terminal, where the acknowledgement frame includes a time difference between time when the processor 501 sends the beacon frame and time when the processor 501 sends the acknowledgement frame. Therefore, after receiving the acknowledgement frame, the terminal compares the offset time with a time difference between time when the terminal itself receives the beacon frame and time when the terminal itself receives the acknowledgement frame, and if a difference between the two is within a preset error range, determines that the acknowledgement frame is an acknowledgement frame that the terminal expects.

Figure 6:
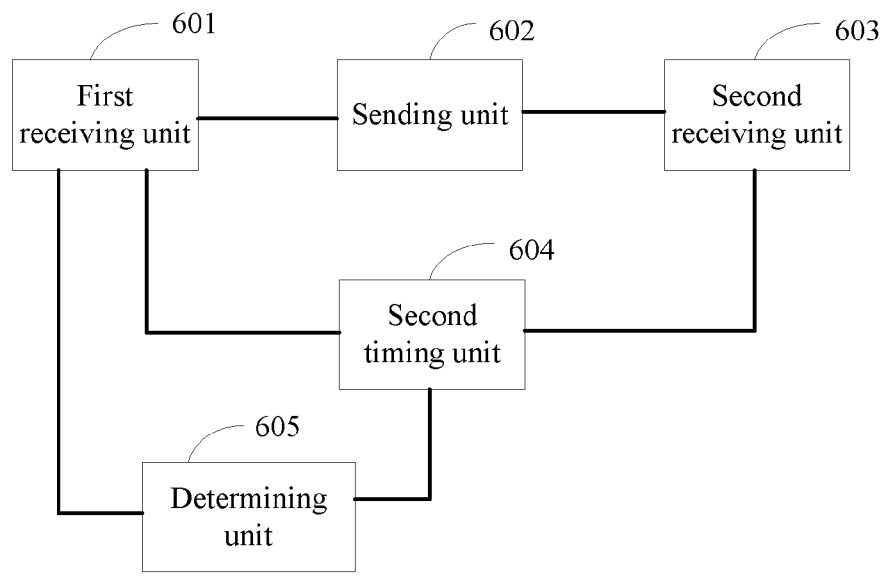
FIG. 6 is a schematic structural diagram of a message acknowledgement terminal according to an embodiment of the present invention.

An embodiment of the present invention also provides a message acknowledgement terminal, with reference to FIG. 6, including: a first receiving unit 601, a sending unit 602, a second receiving unit 603, a second timing unit 604, and a determining unit 605, where the first receiving unit 601 is configured to receive a beacon frame sent by a first access point;

the sending unit 602 is configured to send an uplink frame to the first access point;

the second receiving unit 603 is configured to receive an acknowledgement frame, where the acknowledgement frame includes first offset time, and the first offset time is a difference between a time point when an access point that sends the acknowledgement frame sends the acknowledgement frame and a time point when the access point lately sends a beacon frame;

the second timing unit 604 is configured to record a time point when the acknowledgement frame is received and a time point when the beacon frame is received, and determine a difference between the two as second offset time; and the determining unit 605 is configured to compare the first offset time with the second offset time, and if a difference between the two is within a preset error range, determine that the acknowledgement frame is an acknowledgement frame for the uplink frame by the first access point.

It can be seen from the foregoing that, in the message acknowledgement terminal provided by the embodiment of the present invention, the second receiving unit 603 may receive the acknowledgement frame, where the acknowledgement frame includes a difference value between the time point when the access point sends the acknowledgement frame and the time point when the access point lately sends a beacon frame; the second timing unit 604 in the terminal calculates the time difference between the time point when the terminal receives the acknowledgement frame and the time point when the terminal receives the beacon frame at the same time; and then, the determining unit 605 may determine, by comparing the two time differences, whether the acknowledgement frame is sent by an access point associated with the terminal to the terminal itself.

Figure 7:
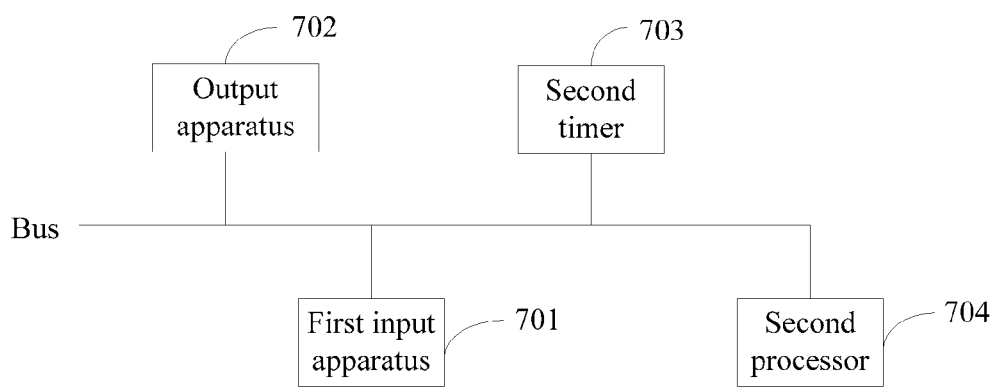
FIG. 7 is a schematic structural diagram of another message acknowledgement terminal according to an embodiment of the present invention.

With reference to FIG. 7, an embodiment of the present invention also provides a message acknowledgement terminal, including: a first input apparatus 701, an output apparatus 702, a second timer 703, and a second processor 704. In some embodiments of the present invention, the first input apparatus 701, the output apparatus 702, the second timer 703, and the second processor 704 may be connected by using a bus or another manner, where in FIG. 7, a connection by using a bus is taken as an example.

The first input apparatus 701 performs the following steps: obtaining a beacon frame sent by a first access point, and obtaining an acknowledgement frame, where the acknowledgement frame includes first offset time, and the first offset time is a difference between a time point when an access point that sends the acknowledgement frame sends the acknowledgement frame and a time point when the access point lately sends a beacon frame.

In the embodiment of the present invention, the output apparatus 702 may send an uplink frame to the first access point according to the beacon frame received by the first input apparatus 701.

The second timer 703 may record a time point when the first input apparatus 701 receives the acknowledgement frame and a time point when the first input apparatus 701 receives the beacon frame, and determine a difference between the two as second offset time.

The second processor 704 may compare the first offset time obtained by the first input apparatus 701 with the second offset time recorded by the second timer 703, and if a difference between the two is within a preset error range, determine that the acknowledgement frame obtained by the first input apparatus 701 is an acknowledgement frame for the uplink frame by the first access point.

It can be seen from the foregoing that, in the message acknowledgement terminal provided by the embodiment of the present invention, the first input apparatus 701 obtains the time difference between the time point when the access point sends the acknowledgement frame and the time point when the access point lately sends a beacon frame; the second timer 703 obtains the time difference between the time point when the terminal receives the beacon frame sent by the first access point and the time point when the terminal receives the acknowledgement frame this time; and at the same time, the second processor 704 compares the two values, and if a difference between the two values is within a preset error range, determines that the acknowledgement frame obtained by the first input apparatus 701 is an acknowledgement frame for the uplink frame by the first access point.

An embodiment of the present invention also provides a message acknowledgement system, including: a first access point and a terminal, where the first access point is configured to send a beacon frame and receive an uplink frame sent by the terminal, and send an acknowledgement frame for the uplink frame, where the acknowledgement frame includes first offset time, and the first offset time is a difference between a time point when the acknowledgement frame is sent and a time point when the beacon frame is sent; and the terminal is configured to receive the beacon frame sent by the first access point and send the uplink frame to the first access point, and receive the acknowledgement frame and calculate second offset time, where the second offset time is a difference between a time point when the acknowledgement frame is received and a time point when the beacon frame is received, and compare the first offset time with the second offset time, and if a difference between the two is within a preset error range, determine that the acknowledgement frame is an acknowledgement frame for the uplink frame by the first access point.

It can be seen from the foregoing that, an acknowledgement frame received by a terminal includes first offset time, and the first offset time corresponds to a sending party of the acknowledgement frame, that is, an access point, and the terminal records a time difference between a time point when the terminal receives a beacon frame and a time point when the terminal receives the acknowledgement frame, that is, second offset time, and moreover, the second offset time is consistent with first offset time of an access point associated with the terminal. Therefore, after receiving the acknowledgement frame, the terminal may compare the first offset time carried in the acknowledgement frame with the second offset time recorded by the terminal itself, and if a difference between the two is within a preset error range, determine whether the acknowledgement frame is sent by the access point associated with the terminal to the terminal itself.

It should be noted that, the access point herein may be a base station.

A person of ordinary skill in the art may understand that all or a part of the steps of the method in the foregoing embodiments may be implemented by a program instructing relevant hardware. The program may be stored in a computer readable storage medium. The storage medium may be a read-only memory, a magnetic disk, or an optical disk, or the like.

At the same time, in the foregoing embodiments, descriptions of the embodiments have different emphases. For a part not described in detail in a certain embodiment, reference may be made to relevant descriptions in other embodiments.

The message acknowledgement method, apparatus, and system in the embodiments of the present invention are described in detail in the foregoing. The principle and implementation manners of the present invention are described herein by applying specific examples. The description of the foregoing embodiments of the present invention is merely provided for ease of understanding of the method and core ideas of the present invention. A person of ordinary skill in the art may make variations to the specific implementation manners and application scopes according to the ideas of the present invention. Therefore, the specification shall not be construed as a limitation to the present invention.

What is claimed is:

1. A message acknowledgement method performed by an access point in a wireless communication system, comprising:
   sending a beacon frame;
   receiving an uplink frame sent by a terminal of the wireless communication system in response to receiving the beacon frame; and
   sending an acknowledgement frame to the terminal in response to receiving the uplink frame, wherein the acknowledgement frame comprises:
   a first offset time indicating a time difference between a time when the acknowledgement frame is sent and a time when the beacon frame is sent, for the terminal to determine, according to the first offset time, and a second offset time, whether the sender of the acknowledgement frame is the access point and the acknowledgement frame transmitted from the sender is the acknowledgement frame transmitted from the access point in response to the uplink frame that the terminal expects;
   wherein the second offset time indicates a time difference between a time when the acknowledgement frame is received by the terminal and a time when a latest beacon frame was received by the terminal.

2. The message acknowledgement method according to claim 1, wherein the method is applied to wireless fidelity communications.

3. The message acknowledgement method according to claim 1, wherein the uplink frame is a downlink data request frame, a sending address in the downlink data request frame is a compressed terminal address of the terminal, and/or, a receiving address in the downlink data request frame is a compressed access point address of the access point.

4. The message acknowledgement method according to claim 2, wherein the uplink frame is a downlink data request frame, a sending address in the downlink data request frame is a compressed terminal address of the terminal, and/or, a receiving address in the downlink data request frame is a compressed access point address of the access point.

5. The message acknowledgement method according to claim 1, wherein a time unit of at least one of the first and second offset times is larger than a time unit of a timing time for controlling sending of the beacon frame and the acknowledgement frame.

6. The message acknowledgement method according to claim 2, wherein a time unit of at least one of the first and second offset times is larger than a time unit of a timing time for controlling sending of the beacon frame and the acknowledgement frame.

7. The message acknowledgement method according to claim 3, wherein a time unit of at least one of the first and second offset times is larger than a time unit of a timing time for controlling sending of the beacon frame and the acknowledgement frame.

8. The message acknowledgement method according to claim 4, wherein a time unit of at least one of the first and second offset times is larger than a time unit of a timing time for controlling sending of the beacon frame and the acknowledgement frame.

9. A message acknowledgement method performed by a terminal in a wireless communication system, comprising:
   receiving a beacon frame sent by an access point of the wireless communication system;
   sending an uplink frame to the access point in response to receiving the beacon frame;
   receiving, after sending the uplink frame, an acknowledgement frame, wherein the acknowledgement frame comprises a first offset time indicating a time difference between a time—when the acknowledgement frame is sent and a time when an associated beacon frame previously transmitted by a sender of the acknowledgement frame was sent;
   calculating a second offset time as a time difference between a time when the acknowledgement frame is received and a time when the beacon frame is received from the access point;
   comparing the first offset time with the second offset time; and
   when a difference between the first offset time and the second offset time is within a preset error range, determining that the sender of the acknowledgement frame is the access point and that the acknowledgement frame is transmitted by the access point in response to receiving the uplink frame.

10. The message acknowledgement method according to claim 9, wherein the method is applied to wireless fidelity communications.

11. The message acknowledgement method according to claim 9, wherein the uplink frame is a downlink data request frame, a sending address in the downlink data request frame is a compressed terminal address of a terminal, and/or, a receiving address in the downlink data request frame is a compressed access point address of the first access point.

12. The message acknowledgement method according to claim 10, wherein the uplink frame is a downlink data request frame, a sending address in the downlink data request frame is a compressed terminal address of a terminal, and/or, a receiving address in the downlink data request frame is a compressed access point address of the first access point.

13. The message acknowledgement method according to claim 9, wherein a timing unit of at least one of the first and second offset times is larger than a timing unit of a timing time for controlling sending of the beacon frame and the acknowledgement frame.

14. The message acknowledgement method according to claim 10, wherein a timing unit of at least one of the first and second offset times is larger than a timing unit of a timing time for controlling sending of the beacon frame and the acknowledgement frame.

15. The message acknowledgement method according to claim 11, wherein a timing unit of at least one of the first and second offset times is larger than a timing unit of a timing time for controlling sending of the beacon frame and the acknowledgement frame.

16. The message acknowledgement method according to claim 12, wherein a timing unit of at least one of the first and second offset times is larger than a unit of timing time for controlling sending of the beacon frame and the acknowledgement frame.

17. A non-transitory computer readable medium including computer-executable instructions for execution on an access point in a wireless communication system such that when the computer-executable instructions are executed by the access point a method is carried out comprising:
   sending a beacon frame;
   receiving an uplink frame sent by a terminal of the wireless communication system in response to receiving the beacon frame;
   sending an acknowledgement frame to the terminal in response to the uplink frame being received, wherein the acknowledgement frame comprises a first offset time for the terminal to determine, according to the first offset time, and a second offset time whether the sender of the acknowledgement frame is the access point and the acknowledgement frame transmitted from the sender is the acknowledgement frame transmitted from the access point in response to the uplink frame that the terminal expects; and
   calculating the first offset time, wherein the first offset time indicates a time difference between a time when the acknowledgement frame is sent and a time when the beacon frame is sent;
   wherein the second offset time is a time difference between a time when the acknowledgement frame is received by the terminal and a time when a latest beacon frame was received by the terminal.

18. A non-transitory computer readable medium including computer-executable instructions for execution on a terminal in a wireless communication system, such that when the computer-executable instructions are executed by the terminal a method is carried out comprising:
   receiving a beacon frame sent by an access point of the wireless communication system;
   sending an uplink frame to the access point in response to receiving the beacon frame;
   receiving an acknowledgement frame, wherein the acknowledgement frame comprises a first offset time indicating a time difference between a time when the acknowledgement frame was transmitted and a time when an associated beacon frame previously transmitted by a sender of the acknowledgement frame was transmitted;
   determining a second offset time as a time difference between a time when the acknowledgement frame was received and a time when the beacon frame was received from the access point; and
   comparing the first offset time with the second offset time, and when a difference between the first offset time and the second offset time is within a preset error range, determining that the sender of the acknowledgement frame is the access point and that the acknowledgement frame is transmitted by the access point in response to receiving the uplink frame.

* * * * *